United States Patent Office 3,532,459
Patented Oct. 6, 1970

---

3,532,459
PROCESS FOR PREPARING SYNTHETIC PHILLIPSITE
James E. McEvoy, Morton, and George Alexander Mills, Swarthmore, Pa., assignors to Air Products and Chemicals, Inc., Philadelphia, Pa., a corporation of Delaware
No Drawing. Filed June 28, 1967, Ser. No. 649,448
Int. Cl. C01b *33/28*
U.S. Cl. 23—112                                   5 Claims

ABSTRACT OF THE DISCLOSURE

Kaolin is calcined above about 965° C. to prepare an amorphous product having, upon differential thermal analysis, a DTA exotherm less than about 5% of that of raw kaolin. The resulting amorphous aluminum disilicate is dispersed in an aqueous sodium hydroxide solution. Seed crystals of the novel species of the group of materials conveniently called synthetic phillipsites are also dispersed in the composition, which is subjected to aging, preferably at a temperature above about 80°, and preferably with stirring to provide a product having a significant amount of said novel species of synthetic phillipsite, the method being highly selective so that the product is free from measurable amounts of other crystalline zeolites. The new species of synthetic phillipsite has an X-ray diffraction as follows:

| "$d$" Spacing A | Relative line intensity, $I/I°$ |
|---|---|
| 7.08 | 85 |
| 4.98 | 41 |
| 4.09 | 72 |
| 3.50 | 8 |
| 3.16 | 100 |
| 2.67 | 51 |
| 1.96 | 13 |

CROSS-REFERENCE TO RELATED APPLICATIONS

Limited reference may be had to the copending applications, identified below and to the applications identified therein, for such general disclosure of raw materials, formulations, conditions of operations, tests and test procedures not specific to the inventive portions therein.

Application of William H. Flank, James E. McEvoy, George Alexander Mills, Ser. No. 628,518, filed April 4, 1967 for Faujasite in Matrix Particles, and application of William H. Flank, James E. McEvoy, George Alexander Mills, Ser. No. 540,201, filed April 5, 1966 for Preparing Cracking Catalysts by Aging at High pH.

An application, Ser. No. 781,951 was filed Dec. 6, 1968 as a merger of two cases, and said Ser. No. 540,201 was abandoned upon the filing of the merger case. Said Ser. No. 781,951 is now Pat. No. 3,515,682. Ser. No. 628,518 is now Pat. No. 3,515,681.

BACKGROUND OF THE INVENTION

Field of the invention

This invention relates to crystalline compounds of silicon having ion exchanging properties, generally called crystalline zeolites, and a method of preparation thereof from systems containing water as a principal constituent, some aluminum compound, and significant amounts of sodium hydroxide. Such crystalline sodium aluminosilicates are also described as molecular sieves. This invention relates to an advantageous novel species of the group of materials conveniently called synthetic phillipsites having multiple repeated uniformly sized internal dimensions having access port size of three angstroms. Each such species has properties as a molecular sieve, sorbent, catalyst, and related end use attributable to its unique structure. The structural differences are evidenced also by the difference in data from X-ray diffraction. This novel species of synthetic phillipsite has a unique X-ray diffraction pattern distinguishable from that of natural phillipsite and/or synthetic phillipsites of the prior art.

Description of the prior art

Phillipsite is found in nature and has been identified and characterized in numerous treatises on minerals, such as by Dana and others. The standard X-ray diffraction pattern information can be found on ASTM Card 13–455 Natural Phillipsite; and is reproduced in the Table 1 below.

Synthesis of phillipsite-type materials has been reported, e.g. by R. M. Barrer et al. in "Hydrothermal Chemistry of the Silicates, Part VIII. Low-Temperature Crystal Growth of Aluminosilicates, and of Some Gallium and Germanium Analogues." Journal of Chem. Soc. 1959 pp. 195–208. X-ray diffraction pattern information relating to Barrer's Species "P" can be found on ASTM Card 12–221; and is reproduced in the Table 1 below. The X-ray pattern differs from that of the pattern of natural phillipsite yet has sufficient points of similarity to be properly classifiable within the same generic name without upsetting the rules of scientific classification.

In U.S. Pat. No. 3,008,803, to R. M. Milton, there is an extensive description of the preparation of a material called Zeolite B. While no reference directs one to a comparison of Zeolite B with natural phillipsite, when comparison is made, see the reported X-ray values in the Table 1 below, there appear certain similarities sufficient to classify Zeolite B within the generic class of phillipsite. In any event, the Milton patent, inter alia, sets forth method for the production of alkali metal-aluminasilica zeolitic material from certain water soluble silicon-containing and water soluble aluminum-containing compositions in the presence of water and alkali, preferably sodium hydroxide.

In U.S. Pat. No. 3,112,176 to W. L. Haden, Jr. and Frank J. Dzierenowski, description centers on the production of a zeolite from metakaolin, a heated kaolin still retaining the hereinafter described kaolin exotherm. This unnamed zeolite is formed in dilute caustic at conditions other than those optimum to formation of Zeolite A. The Haden zeolite also has certain similarities to natural phillipsite as shown in the Table 1 below and similarly, e.g. in X-ray diffraction pattern, with the Milton Zeolite B.

The Table 1 below presents the X-ray diffraction data of these several art-identified species of the class phillipsite.

TABLE 1

| 3112176 Hayden Zeolite dA | I/I° | 3008803 Milton Zeolite B dA | I/I° | 12-221 ASTM Barrer Species P dA | I/I° | 13-455 ASTM Phillipsite dA | I/I° |
|---|---|---|---|---|---|---|---|
|  |  |  |  |  |  | 8.06 | 20 |
|  |  |  |  |  |  | 7.15 | 100 |
|  |  | 7.10 | 96 | 7.1 | 100 |  |  |
| 7.08 | 64 |  |  |  |  |  |  |
|  |  |  |  |  |  | 6.38 | 40 |
|  |  |  |  |  |  | 5.38 | 40 |
|  |  |  |  |  |  | 5.05 | 60 |
|  |  |  |  | 5.0 | 60 |  |  |
| 4.98 | 38 |  |  |  |  |  |  |
|  |  | 4.97 | 61 |  |  | 4.97 | 60 |
|  |  |  |  | 4.94 | 60 |  |  |
|  |  |  |  |  |  | 4.28 | 20 |
|  |  |  |  |  |  | 4.12 | 80 |
|  |  | 4.10 | 25 |  |  |  |  |
|  |  |  |  | 4.09 | 100 | 4.09 | 60 |
| 4.07 | 68 |  |  | 4.07 | 10 |  |  |
|  |  |  |  |  |  | 3.96 | 40 |
|  |  |  |  | 3.65 | 10 |  |  |
|  |  |  |  |  |  | 3.59 | 20 |
|  |  |  |  | 3.50 | 5 |  |  |
|  |  |  |  |  |  | 3.46 | 60 |
|  |  |  |  |  |  | 3.43 | 40 |
|  |  |  |  | 3.32 | 40 |  |  |
|  |  |  |  |  |  | 3.29 | 60 |
|  |  |  |  | 3.26 | 20 |  |  |
|  |  |  |  |  |  | 3.24 | 80 |
|  |  |  |  |  |  | 3.20 | 100 |
|  |  | 3.18 | 100 | 3.18 | 100 |  |  |
| 3.15 | 100 |  |  |  |  |  |  |
|  |  |  |  |  |  | 3.14 | 80 |
|  |  |  |  | 3.11 | 100 |  |  |
|  |  |  |  |  |  | 3.10 | 20 |
|  |  | 3.02 | 20 |  |  |  |  |
|  |  | 2.96 | 10 |  |  |  |  |
|  |  |  |  |  |  | 2.93 | 80 |
|  |  |  |  |  |  | 2.90 | 20 |
| 2.89 | 17 |  |  |  |  |  |  |
|  |  |  |  |  |  | 2.88 | 20 |
|  |  |  |  |  |  | 2.81 | 20 |
|  |  |  |  |  |  | 2.75 | 80 |
|  |  |  |  | 2.73 | 10 |  |  |
|  |  |  |  |  |  | 2.70 | 80 |
|  |  | 2.68 | 67 | 2.68 | 80 |  |  |
|  |  |  |  | 2.65 | 60 |  |  |
| 2.54 | 65 |  |  |  |  |  |  |
|  |  |  |  | 2.52 | 20 |  |  |
| 2.49 | 8 |  |  |  |  |  |  |
|  |  |  |  | 2.42 | 20 |  |  |
|  |  |  |  | 2.38 | 10 |  |  |
| 2.36 | 12 |  |  |  |  |  |  |
|  |  |  |  | 2.24 | 10 |  |  |
| 1.96 | 15 |  |  |  |  |  |  |
| 1.78 | 8 |  |  |  |  |  |  |
| 1.62 | 5 |  |  |  |  |  |  |

SUMMARY OF THE INVENTION

In accordance with this invention crystalline zeolite is synthesized substantially free of other forms of crystalline zeolites from precursor materials consisting of certain natural clays, and an aqueous alkaline menstruum. The synthesis of this novel species of synthetic phillipsite is effected in the presence of an added minor amount, as seed, of crystalline zeolite of the type desired as product. The conditions of synthesis include a formulation in which suitably conditioned natural clay is present in an aqueous alkaline menstruum in the respective weight ratios of 4–6:–10:1 of clay:water:NaOH equivalent; the formulation being aged at room temperature or higher, such as at a temperature in the range of 80–120° C., for from 5 hours to five days—preferably with agitation. The aged material is comprised of this novel species of synthetic phillipsite as the alkaline, synthesized crystalline zeolite. The aged material may be treated thereafter for development of molecular sieve properties or such properties as may be appropriate or desirable.

GENERAL AND DETAILED DESCRIPTION OF THE INVENTION

While phillipsite is found in nature the amounts are of no particular commercial significance since such findings are neither massive nor of dependable purity. The synthesis of phillipsite in the laboratory has been demonstrated by Barrer and others using the components which under appropriate conditions crystallized in a type of phillipsite pattern. Milton prepares his zeolite starting with generally water soluble forms of the specific ingredients, such as sodium silicate and sodium aluminate, that crystallize under appropriate conditions to his crystalline product. Milton teaches proportions for his starting material of $Na_2O/SiO_2$ of 0.38–0.61/1; and $H_2O/Na_2O$ of 10–50/1. Haden synthesizes his zeolite from an aqueous caustic medium containing meta kaolin, i.e., kaolin calcined from about 800° to about 1600° F. producing a mildly calcined kaolin.

The present invention offers various improvements and advantages.

One such advantage resides in the source of the silica-alumina components of the final product. Such source materials include a variety of naturally occurring clays available in large quantities and amenable, either in the form obtained from natural deposits or after relatively simple purification treatment, to use as precursor material in the present invention. Such naturally occurring clays include kaolin, kaolinite, halloysite, and others which are hydrated aluminosilicate minerals which meet certain requirements. Such requirements are that the raw mineral must have a weight of silica greater than the weight of alumina. Expressed as a unit mol ratio, the silica to alumina unit mol ratio in the mineral must be greater than 1.7:1. The total of the combined silica to alumina is greater than the total of all other metal oxides and this predominance supports the term of aluminosilicate.

Analysis of the mineral may show the presence of alkali and alkaline earth metals, usually reported as oxides, such as sodium, potassium, calcium and/or magnesium. In the acceptable mineral the ratio, excluding silica atoms, of aluminum atoms to each of such alkaline earth metal atom is at least 10:1 and to each of the other metal atoms, exclusive of the alkali and alkaline earth metals, should be greater than about 20:1. Such other metals, usually reported as oxides, may be titanium, iron or the like.

The mineral must contain water which is not removed by heating at normal drying temperature, a situation supporting the designation of the mineral as a hydrated material. The relationship of this hydrate water in the mineral is a further means of establishing the suitability of the material as well as establishing the proper amount of preconditioning of such mineral necessary to provide the optimum state as a suitable precursor for phillipsite synthesis. In the case of kaolin an exotherm appears at about 980° C. in the Differential Thermal Analysis (hereinafter designated as DTA). DTA is a standard procedure in which material is raised in temperature in a controlled increasing temperature environment wherein temperature changes within the mineral and deviating from the normal temperature increase induced by its environment are utilized to indicate, among other things, the loss of hydrate water. Other suitable hydrated aluminosilicates exhibit exotherms, but not necessarily at the same approximate level as shown by kaolin. The use of this exotherm phenomenon is not disturbed by any such difference.

The clays meeting the above requirements are brought to a suitable state as an appropriate precursor by a regime of simple heating at a temperature within the range of 950° to 1200° C., the preferred range for kaolin being about 965–1095° C. and more particularly preferably 1030° C.±20° C. The adequacy of such calcination conditions can be shown by two measurements possible on the calcined material.

One such measurement is effected on the calcined material in the DTA analysis which should show that the residual exotherm in the calcined raw material has a magnitude of less than 15% and preferably less than 3% of the exotherm exhibited by the uncalcined material. Such a result is an indication of the minimum sufficiencies of calcination. Since calcination at too high a temperature level can result in sintering and other unaccpetable qualities of the calcined material the maximum limit of calcination can be determined by subjecting the product to a simple test which can be called an alkaline leaching test.

This testing treats a pulverized sample of the calcined material with six times its weight of a five molar solution of aqueous sodium hydroxide at about ambient temperature for a period of 48 hours. The resulting solution is analyzed and when the unit mol ratio of dissolved silica to dissolved alumina in the solution is less than 25:1 the maximum practicality level of calcination has not been exceeded. The alkaline leaching test is also suitable in showing a general effective level of calcination supplementing the DTA values when the analysis of the final solution shows that the unit mol ratio of dissolved silica to dissolved alumina is greater than 5:1. A further requirement is that the dissolved silica and alumina must be at least 10% by wt. of the sample to validate both the minimum and the maximum values of the silica to alumina ratio in the solution.

Another advantage resides in the ability to direct the course of crystallization in such manner that the desired zeolite is the only zeolite crystal obtained as the formed zeolite product. This phenomenon is effected by the expedient of introducing into the system for crystallization a minor amount, such as in the range of 0.2 to 10 wt. percent of the total aluminosilicate precursor composition, of substantially pure zeolite crystals of the type desired as final product to act as seed materials.

In the course of investigation in the synthesis of a variety of zeolites it was discovered that the zeolite of the present invention proved to be synthesized in an impure form during the course of synthesizing zeolites of the faujasite type wherein it was ascertained that faujasite was a semi-metastable crystalline form that could under extremely severe conditions recrystallize to a more stable crystalline pattern of the phillipsite type. While this situation did in fact produce a phillipsite type zeolite material in greater or lesser degree, control of the final product was extremely difficult and it contained both synthetic phillipsite and synthetic faujasite. It was further discovered, however, that material comprising synthetic faujasite and synthetic phillipsite could be treated with a dilute acid system such as 10% nitric acid, at ambient temperature for a reasonable length of time with a surprising result that all of the faujasite crystalline material went into solution while the phillipsite type of crystalline material remained substantially unaffected. Thus it was discovered that substantially pure phillipsite could be obtained as the zeolitic component. However, the total possible amount was not obtained and more or less loss, as by solution, resulted. It was then further discovered that such purified zeolite had use as seed material. Further, it was found that when such seed material was employed the synthesis was surprisingly limited to a product containing the desired synthetic phillipsite as the sole zeolitic component.

Thus the synthesis of crystalline synthetic phillipsite by the present invention involves the preparation of a precursor mixture composed of the properly calcined clay, as above defined, in an aqueous alkaline system in the weight ratios of 4–6 clay to 4–10 water to one part of NaOH equivalent and the presence of suitable seed.

The term caustic equivalent is generally and preferably sodium hydroxide. However, at least one of lithium hydroxide, magnesium hydroxide, potassium hydroxide, calcium hydroxide or methyl quaternary ammonium hydroxide may be substituted in part, such as up to no more than 10% by weight of the caustic equivalent, on stoichiometric equivalency for the sodium hydroxide and therefore the sodium hydroxide equivalent value contemplates the employment of NaOH alone or in suitable combination in the weight ratio formulation control.

The mixture, which may be in the form of a slurry, is then subjected to an aging treatment wherein crystallization in the desired pattern occurs. Crystallization may occur when the aging is conducted at ambient temperature conditions over an extended time such as for 4 days or usually more. However, better control of the final product with shorter processing times is obtained when the aging is effected at moderately elevated temperatures. Two methods have been found to be quite effective. In one method the mixture is subjected to a first aging at about ambient temperature for a time period which may range up to 5 days and thereafter followed by an aging at an elevated temperature in the range of 80° C. to 120° C. for a further time period in the order of several hours to 5 days or so. The extended times are not detrimental to the formation of the zeolite but generally contribute no particular advantage so that in ordinary practice the aging at ambient temperature is no longer than about one day and the elevated temperature aging likewise is limited to no longer than about one day.

The other aging system, which is preferred, contemplates the subjection of the mixture to aging temperature in the range of 80° C. to 120° C. for a time period in the order of 5 hours to 5 days, preferably in the range of 10–35 hours. In a preferred practice in the synthesis of the crystalline zeolite the mixture during the aging period is subjected to a mild form of agitation in that it appears to enhance and to speed up the formation of phillipsite crystals. While there is no intent to be limited to the possible theory involved, it may be that the agitation distributes the seed material initially and thereafter the further formed zeolite crystals also provide a seeding effect thus promoting an earlier crystallization pattern throughout the system.

DESCRIPTION OF THE PREFERRED EMBODIMENTS

Example I

A mixture was prepared from 150 parts of a calcined kaolin, meeting the requirements in accordance with both the DTA and the alkaline leaching test, and 202 parts of 17.9% aqueous caustic solution. The mixture was allowed to age quiescently for about 24 hours at room temperature. After the one day aging the temperature of the mixture was raised to 90–98° C. with reasonable effort directed to maintaining the temperature at 96° C. At this elevated temperature the mixture was subjected to mild agitation and kept at these conditions for a further aging period of about 24 hours. The mixture was allowed to cool to room temperature and portions thereof were segregated for further examination.

A portion was subjected to water washing to remove water soluble salts. The washed solids were dried and ground to fine powder. A sample of the powder was conditioned in a 50% relative humidity atmosphere to a steady state humidification and a portion thereafter subjected to X-ray diffration analysis. The analysis showed the presence of two zeolitic crystalline materials by their readily separable patterns which corresponded respectively to that of faugasite and phillipsite.

Two portions fo the water washed material were each separately treated with different dilute acids. One portion was treated with twenty times its weight of 10% nitric acid. The other portion was treated with twenty times its weight of 4% sulfuric acid. Both treatments were for 30 minutes with occasional stirring. Each of the thus acid-treated samples was water washed, dried, ground and equilibrated in a 50% relative humidity atmosphere for X-ray diffraction examination. Both samples, by X-ray diffraction, gave patterns showing the presence of a single form of zeolitic crystalline material having a pattern reasonably comparable with that of natural phillipsite.

The effect in the synthesis of zeolitic material of the several portions thus prepared and analyzed was examined along with a preparation in which such material was absent. Since results obtained with the several acid washed samples were substantially identical only the results obtained with the nitric acid treated material are reported.

Each of the several test samples was prepared in substantially identical manner except that the material containing no added seed material did not include the approximately 4% additive seed. With the exception of the seed material the composition of the starting materials consisted of a properly calcined kaolin meeting the above-identified requirements, reagent grade NaOH and distilled water. The compositions were

TABLE 2

| | Parts by weight calcined Kaolin | Parts by weight seed | Parts by volume caustic solution[1] |
|---|---|---|---|
| Sample A (no seed) | 243 | | 250 |
| Sample B (water washed seed) | 243 | 10 | 250 |
| Sample C (acid leached seed) | 243 | 10 | 250 |

[1] Caustic solution master batch composed of 350 parts of NaOH dissolved in 1,000 parts of $H_2O$.

The dry ingredients were admixed thoroughly and then added to the caustic solution with stirring for 5 minutes. The samples were each covered to prevent evaporative losses and then aged to 105° F. for 36 hours. After such aging there was added to each sample an additional 250 parts by weight of water with stirring to uniform consistency. The samples were again covered and placed in an oven at 205° F. for 26 hours. The samples were then uncovered and each poured directly into separate portions (3000 parts) of 20% $NH_4NO_3$ solution. The solids were freed of the solution and then given three successive leaches with 20% $NH_4NO_3$ (fresh) solution, effected by covering the solids with the solution, stirring and allowing to stand for thirty minutes. The thus-leached samples were given three successive water washes in like manner. Small portions of each were dried and prepared for X-ray analysis and tested. The X-ray diffraction patterns showed the presence of the indicated zeolitic materials and the pattern of the synthetic phillipsite was substantially as shown in Table 4, below. The relative amounts of the zeolitic components were determined as shown in Table 3, as follows:

TABLE 3

| | Percent faujasite | Percent synthetic phillipsite |
|---|---|---|
| Sample D (no seed) | 28 | 0 |
| Sample E (seed containing faujasite and phillipsite) | 4.3 | 8+ |
| Sample F (seed containing phillipsite) | 0 | 70 |

The effect of proper seed and seeding is quite evident.

Example II

A larger scale preparation was made. 2.0 kilograms of Satintone-1 was used as the clay precursor. This is a commercially available calcined kaolin clay having various industrial uses, such as in weighting paper stock. The particular sample employed not only passed the alkaline leaching test but exhibited by DTA an exotherm less than 3% of that normally obtained with raw kaolin. The clay was thus established as suitable precursor aluminosilicate. The caustic employed was in pellet form (97% pure) and amounted to 0.412 kg. Distilled water amounted to 2060 ml.

For seed purposes Sample F of Example I was selected for use. Since most of the sodium had been displaced by the ammonium nitrate treatment the sample was pulverized, treated three times with 10% caustic solution to resubstitute sodium for ammonium ion in the zeolite, then washed three times with water and dried at 105° C. overnight. Of this dried material 100 grams was employed for seeding.

The caustic was dissolved in the water and the solution cooled to 60° F. The Satintone-1 and the seed material were blended dry in a V-blender for half an hour and then stirred into the cooled caustic solution with stirring for five minutes to ensure good mixing. The mixture was covered and aged at 105° F. for 36 hours. Subsequently the cover was removed and an additional 824 ml. of water was stirred into the partially aged mixture. The material was then recovered and placed in an oven at 205° F. where it was allowed to age further for 28 hours.

After the further aging the material was brought to about room temperature and then subjected to thorough washing first with 1% caustic and then with plain water. The washed solids were dried in an oven with through air flow at 220° F. for eight hours. The dried product weighed 2.049 kilograms. X-ray diffraction analysis showed that the only crystalline pattern was that of the synthetic phillipsite and was substantially the same as shown in Table 4 below. All of the product of this example, saving only minor amounts withdrawn for sample and test purposes, was employed as seed material for the preparation described immediately below.

Example III

The starting materials were Satintone-1, pelleted caustic and distilled water. 15 pounds of 97% NaOH was dissolved in 75 pounds of water and cooled to room temperature. 49 pounds of Satintone-1 and 1135 gms. of the product of Example II were added to the caustic solution with stirring. The entire mixture was contained in a Pfaudler kettle having suitable heating arrangements. Stirring of a moderate nature was used during the mixing and during the subsequent aging system with a stirring rate of approximately 168 r.p.m. Kettle temperature was brought up to 140° F. and held there for approximately 2 hours and then the temperature was raised to approximately 210° F. over a period of 40 minutes and held at about that temperature with stirring for 24 hours. During the aging period approximately 5 pounds of water was added about one-quarter of the way through to maintain a suitable stirrable consistency. The kettle was then allowed to cool down to about room temperature. 16 pounds of 1% aqueous caustic solution was added and stirred throughout the mix which was then allowed to drain from the kettle. The drained material was taken in a stainless steel container and subjected to 3 successive batch washings with 1% aqueous caustic solution by the stir-and-settle procedure and thereafter given 5 successive hot water washes by the stir-and-settle system. The washed material was dried in a Proctor and Schwartz oven with through flow air at approximately 220° F. The dried product weight was 44.5 pounds.

Analysis on portions of this sample showed the following types of information. By chemical analysis the sodium form material showed a composition of silica 46.13 wt. percent, alumina 37.2 wt. percent and sodium as $Na_2O$ 15.40 wt. percent. The sodium form zeolite was subjected to base exchange treatment with warm 20% ammonium nitrate solution, water washed and dried. On an ignited basis, chemical analysis showed the presence of 0.08 $Na_2O$ wt. percent; 9.25 wt. percent $NH_4$ and 0.29 wt. percent $NO_3$. Based on these relative data the calculated base exchange capacity is 5.1 meq./g. Tests on the deionization of calcium-containing water have shown this material to be an effective ion exchange material and readily capable of reactivation. Surface area measurements were run by the standard BET method. On the ammonium exchanged material in dry form the surface area measured 35 m.$^2$/g. Calcination in air at 1050° F. for 2 hours showed minor increase in surface area to 39 m.$^2$/g.

X-ray diffraction measurements were made on the sodium form product. The X-ray diffraction pattern matches no known diffraction pattern for any other but in its relatively major peaks is similar to the diffraction pattern of natural phillipsite to the extent that it is reasonably identified as a synthetic phillipsite.

TABLE 4

X-ray diffraction

| "d" Spacing A | Relative line intensity, I/I° |
|---|---|
| 7.08 | 85 |
| 4.98 | 41 |
| 4.09 | 72 |
| 3.50 | 8 |
| 3.16 | 100 |
| 2.67 | 51 |
| 1.96 | 13 |

Among other tests on this synthetic phillipsite the possible catalytic activity of the material for the cracking of hydrocarbons was investigated in the standard CAT–D–1 test described by Harriz in "Hydrocarbon Processing," vol. 45, No. 10, pages 183–188 of 1966. Tests were run on the calcined ammonium exchanged material and on a mixture of 50% of the ammonium exchanged material in admixture with 50% raw kaolin clay. All three samples were subjected to a standard artificial aging treatment at 1350° F. for 2 hours in 100% air. The results are indicated in the following table.

TABLE 5

| Sample | CAT-D-1 results | | | | | |
|---|---|---|---|---|---|---|
|  | Gasoline, vol. percent | Coke, wt. percent | Gas, wt. percent | Gas, gravity | Select. Conv. wt. percent | Percent to gasoline |
| Product of Ex. III | 25.0 | 1.9 | 8.8 | 0.97 | 32.7 | 67.3 |
| 50% prod. Ex. III 50% raw kaolin | 30.5 | 1.2 | 7.2 | 1.27 | 35.2 | 76.1 |
| Raw kaolin | 11–15 | | | | | |

Calculations and physical measurements on the zeolitic material show that the port size openings of the zeolitic crystal is approximately 3 A. units and therefore excludes from its interior molecules having diameter dimensions in excess of 3 A. Thus when tested for the separation capacity by molecular diffusion of oxygen from nitrogen in an air sample, no separation was found. When tested with a 50% alcohol and 50% water mixture it was found that water was selectively absorbed with the result that the concentration of ethyl alcohol was increased over that of the original sample.

A sample of the ammonium exchanged catalyst subjected to the same type of artificial aging as employed in the treatment of the catalyst used in the CAT-D-1 test was employed as catalyst in an operation directed to the conversion of N-amino ethyl piperazine at conditions including temperature of 680° F., atmospheric pressure, space rate of 0.7, with the resulting product showing the cyclized product, triethylenediamine, in a yield of approximately 25 wt. percent of the charge.

In other test operations directed to the synthesis of this form of synthetic phillipsite it is found that a substitution of halloysite for raw kaolin, when properly calcined, produces high yields of synthetic zeolite substantially identical to those obtained from kaolin precursors when the conditions of synthesis including the seeding operation are followed within the ranges hereinabove set forth.

Example IV

A sample of china-grade halloysite from Spruce Pine, North Carolina is calcined at approximately 2100° F. for one hour. The caustic solubility test shows approximately 18.5 wt. percent dissolved solids and a silica/alumina molar ratio of 11+. The DTA exotherm is less than 5% that of the comparable exotherm of the uncalcined halloysite. The calcined clay is admixed with 5 wt. percent of product from Example III in sodium form and the admixture is stirred into aqueous caustic solution to provide a precursor mix having the proportions $$2.24Na_2O \cdot 6.48[Al_2O_3 \cdot 2SiO_2] 61H_2O$$

The container is covered to limit evaporation and the contents heated over a four hour period to about 96° C. Stirring is continued throughout the heating and aging period. The aging at 96° C. is continued for 36 hours, with small samples for test purposes withdrawn at 5, 14 and 24 hours after the start of aging. Analysis of the samples show the only zeolite present is synthetic phillipsite. Zeolite in the 5-hour sample is 17%; in the 14-hour sample is 53%; in the 24-hour sample is 58%; and in the final product is 59%.

Obviously, many modifications and variations of the invention as hereinbefore set forth may be made without departing from the spirit and scope thereof, and therefore only such limitations should be imposed as are indicated in the appended claims.

What is claimed is:

1. The method of preparing a synthetic zeolite of the phillipsite type having four-coordinate alumina-silica structure of substantially only a 3 A. port opening molecular sieve structure with an X-ray diffraction pattern as follows:

| "d" Spacing A: | Relate line intensity, I/I° |
|---|---|
| 7.08 | 85 |
| 4.98 | 41 |
| 4.09 | 72 |
| 3.50 | 8 |
| 3.16 | 100 |
| 2.67 | 51 |
| 1.96 | 13 | said method comprising (a) calcining a hydrated aluminosilicate selected from the group consisting of kaolin, halloysite, and mixtures thereof at a temperature within the range of 1010° C. to 1050° C. to provide a reactive, amorphous, calcined aluminosilicate exhibiting by Differential Thermal Analysis an exotherm which is less than 15% of the exotherm exhibited by the uncalcined aluminosilicate and forming an aqueous alkaline aluminosilicate consisting essentially of calcined, reactive, amorphous aluminosilicate, water, and alkali in which the weight ratios are 4–6 said calcined reactive amorphous aluminosilicate to 4–10 water to 1 part of NaOH, any caustic other than NaOH being deemed for such proportioning to be the equivalent weight of the NaOH, modifying said aqueous alkaline aluminosilicate to prepare a mixture by the inclusion of from 0.2 to 10 wt. percent of the seed crystals of a synthetic crystalline zeolite of the phillipsite type having an X-ray diffraction pattern as follows:

| "d" Spacing A: | Relative line intensity, I/I° |
|---|---|
| 7.08 | 85 |
| 4.98 | 41 |
| 4.09 | 72 |
| 3.50 | 8 |
| 3.16 | 100 |
| 2.67 | 51 |
| 1.96 | 13 |

(b) subjecting said mixture to aging at conditions including a temperature of at least 80° C. for a time period of at least 5 hours, and forming during such aging additional synthetic crystalline zeolite having substantially only the character and identification identical to that of said added crystalline synthetic zeolite of step (a); and (c) separating a synthetic crystalline zeolite of the phillipsite type as the product of the method.

2. The method of claim 1 wherein said added seed crystals of crystalline synthetic zeolite are prepared by treatment of a mixture of sodium faujasite and sodium phillipsite with a dilute inorganic acid adapted to dissolve the sodium faujasite without dissolving the phillipsite seed crystals.

3. The method of claim 1 wherein said product of hydrated sodium phillipsite is subjected to base exchange with an ammonical solution, removing by said base exchange the sodium content as $Na_2O$, in excess of 0.1 wt. percent expressed as the weight percent of the base exchanged solids on an ignited basis, and to prepare ammonium phillipsite.

4. The method of claim 3 wherein said ammonium phillipsite in low sodium form is further treated at an elevated temperature, decomposing at said elevated temperature the ammoniacal component, and recovering from said elevated temperature treatment synthetic crystalline phillipsite in the $H^+$ form and characterized in having a sodium content no higher than 0.1 wt. percent expressed as $Na_2O$ on an ignited basis.

5. The method of claim 1 further characterized in that during said aging the mixture is agitated for at least a portion of the aging period.

References Cited

UNITED STATES PATENTS

| | | | |
|---|---|---|---|
| 3,008,803 | 11/1961 | Milton | 23—113 |
| 3,112,176 | 11/1963 | Haden et al. | 23—113 |
| 3,119,660 | 1/1964 | Howell et al. | 23—112 |
| 3,433,587 | 3/1969 | Haden et al. | 23—112 |

FOREIGN PATENTS

| | | |
|---|---|---|
| 898,457 | 6/1962 | Great Britain. |

OTHER REFERENCES

Barber et al. "J. Chem. Soc." 1959, part I, pp. 195–208.

EDWARD J. MEROS, Primary Examiner

U.S. Cl. X.R.

252—455

FO-1050
(5/69)

UNITED STATES PATENT OFFICE
CERTIFICATE OF CORRECTION

Patent No. 3,532,459      Dated October 6, 1970

Inventor(s) James E. McEvoy et al

It is certified that error appears in the above-identified patent and that said Letters Patent are hereby corrected as shown below:

Column 2, line 8 - "repeated" should read --repeating--

Column 3, line 55 - "4-6:-10:1" should read --4-6:4-10:1--

Column 3, line 62 - "such" should read --such other--

Column 5, line 34 - "zeolite" should read --zeolitic--

Column 5, line 42 - "faujasite" should be --faujasitic--

Column 6, line 51 - "diffration" should read --diffraction--

Column 6, line 55 - "faugasite" should be --faujasite--

Column 6, line 56 - "fo" should read --of--

Column 7, line 24 - "to" should read --at--

Column 10, line 35 - "relate" should read --relative--

Column 11, line 15 - "ammonical" should read --ammoniacal--

Signed and sealed this 20th day of July 1971.

(SEAL)
Attest:

EDWARD M. FLETCHER, JR.
Attesting Officer

WILLIAM E. SCHUYLER, JR.
Commissioner of Patents